(12) United States Patent
Wall et al.

(10) Patent No.: US 11,663,573 B2
(45) Date of Patent: *May 30, 2023

(54) SYSTEMS AND METHODS FOR READER DEVICE REGISTRATION, USE, AND MANAGEMENT

(71) Applicant: Stripe, Inc., South San Francisco, CA (US)

(72) Inventors: Jonathan Wall, South San Francisco, CA (US); Devesh Senapati, South San Francisco, CA (US); Nate Barnett, South San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,727

(22) Filed: Dec. 17, 2021

(65) Prior Publication Data

US 2022/0108293 A1 Apr. 7, 2022

Related U.S. Application Data

(63) Continuation of application No. 16/570,792, filed on Sep. 13, 2019, now Pat. No. 11,205,164.

(Continued)

(51) Int. Cl.
*G06Q 20/20* (2012.01)
*G07G 1/00* (2006.01)
(Continued)

(52) U.S. Cl.
CPC ......... *G06Q 20/206* (2013.01); *G06Q 20/202* (2013.01); *G06Q 20/204* (2013.01);
(Continued)

(58) Field of Classification Search
CPC .............. G06Q 20/206; G06Q 20/204; G06Q 20/202; G07G 1/01; G07G 1/0045; G07G 1/14

See application file for complete search history.

(56) References Cited

U.S. PATENT DOCUMENTS

| | | | | |
|---|---|---|---|---|
| 5,604,802 A | * | 2/1997 | Holloway | ........ G06Q 20/40145 380/280 |
| 6,877,093 B1 | * | 4/2005 | Desai | .................... H04L 9/3247 713/156 |
| 9,978,049 B2 | * | 5/2018 | Dunstan | ................ G07F 17/329 |

(Continued)

OTHER PUBLICATIONS

"EMV Key Management—Explained". Retrieved from <https://www.cryptomathic.com/hubfs/docs/cryptomathic_white_paper-emv_key_management.pdf>. 2017. (Year: 2017).*

(Continued)

*Primary Examiner* — Nathan A Mitchell
(74) *Attorney, Agent, or Firm* — Womble Bond Dickinson (US) LLP

(57) ABSTRACT

A method and apparatus for reader device registration, activation, and use are described. The method may include receiving, by a commerce platform, a registration request generated by a reader device, wherein the registration request comprises at least identification data for the reader device. The method may also include transmitting, to the reader device, a registration code. The method may also include receiving, by the commerce platform from a merchant system, a second registration code purported to be the registration code transmitted to the reader device. The method may also include generating an encryption key associated with the reader device and transmitting the encryption key to the merchant system, wherein the encryption key is provided by merchant system to the reader device for use by the reader device when communicating with the commerce platform during merchant transactions.

22 Claims, 9 Drawing Sheets

Related U.S. Application Data

(60) Provisional application No. 62/731,649, filed on Sep. 14, 2018.

(51) Int. Cl.
*G07G 1/14* (2006.01)
*G07G 1/01* (2006.01)

(52) U.S. Cl.
CPC .............. *G07G 1/0045* (2013.01); *G07G 1/01* (2013.01); *G07G 1/14* (2013.01)

(56) References Cited

U.S. PATENT DOCUMENTS

| | | | | |
|---|---|---|---|---|
| 2003/0222135 | A1* | 12/2003 | Stoutenburg | G06Q 20/042 235/379 |
| 2009/0198803 | A1* | 8/2009 | Meckenstock | G06Q 20/20 709/221 |
| 2010/0161433 | A1* | 6/2010 | White | G06Q 20/40 705/17 |
| 2010/0198728 | A1* | 8/2010 | Aabye | G06Q 20/40 726/19 |
| 2012/0150669 | A1* | 6/2012 | Langley | G06Q 20/356 705/16 |
| 2014/0310183 | A1* | 10/2014 | Weber | G06Q 20/3829 705/71 |
| 2016/0275515 | A1* | 9/2016 | Quigley | G06Q 20/3829 |
| 2017/0231022 | A1* | 8/2017 | Ito | H04L 63/061 |
| 2018/0018663 | A1* | 1/2018 | Van | G07F 7/0873 |
| 2018/0150820 | A1* | 5/2018 | Schultze | H04L 12/4633 |

OTHER PUBLICATIONS

"eDynamo Firmware & EMV Tags for QwickPAY". Retrieved from <https://www.magtek.com/support/edynamo/firmware> on Apr. 6, 2021. (Year: 2021).*

* cited by examiner

SYSTEMS AND METHODS FOR READER DEVICE REGISTRATION, USE, AND MANAGEMENT

PRIORITY

The present application claims the benefit of, and is a continuation of U.S. patent application Ser. No. 16/570,792, filed Sep. 13, 2019, which is a non-provisional of U.S. Provisional Application No. 62/731,649, filed Sep. 14, 2018, both of which are incorporated by reference in their entirety.

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a card reader, and the card reader will collect card data, such as Europay, Mastercard, Visa, etc. data collected from a credit, debit, gift card, electronic benefits, or other payment instrument provided by the customer. In order to collect the card data, a magnetic strip or an integrated circuit of the card is read by a card reader. That card data is then used by the POS device and/or the card reader to authorize the transaction, for example by a commerce platform, and ultimately approve and charge the fee for the merchant with banks and/or card providers.

When a new card reader is needed (e.g., to replace a broken reader, to add a new reader device to a location of the merchant, etc.), installation of the card reader and connecting that card reader to a merchant's POS device can be a labor intensive and/or difficult process requiring the assistance of a person with special knowledge, such as an IT professional. That is, the new card reader creates the technical problem of how the existing merchant's systems (e.g., a merchant's POS device, merchant servers, etc.) find, recognize, and trust the new card reader. Furthermore, another technical problem exists because the trust must be such that the identity of a new card reader can be relied upon by remote systems (e.g., the POS device, merchant systems, authorization network systems, commerce platform systems, etc.) for taking in and using sensitive financial information of consumers, and that communications of sensitive financial information during transactions is secure. That is, since financial and/or other sensitive consumer information may be handled by the card reader, it is very important that the identity of the card reader be established, that this card reader is the actual reader device associated with the merchant, and that the card reader ensures the confidentiality of consumer information during communications.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
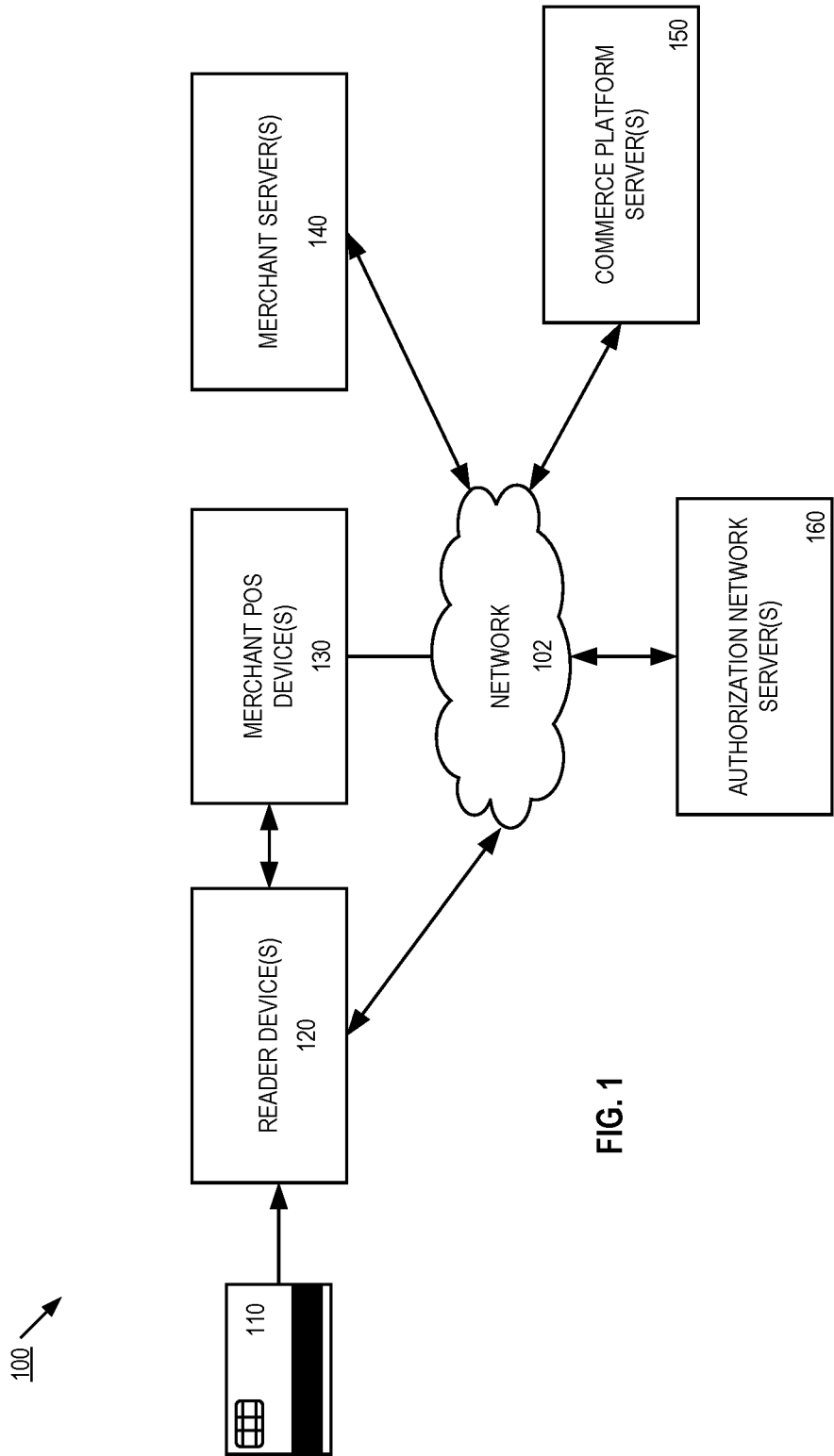
FIG. 1 is a block diagram of an exemplary system architecture for reader device activation and management.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "decrypting", "extracting", "configuring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for reader device activation and management. In embodiments, the reader device is used for processing merchant payments with a commerce platform.

Figure 7:
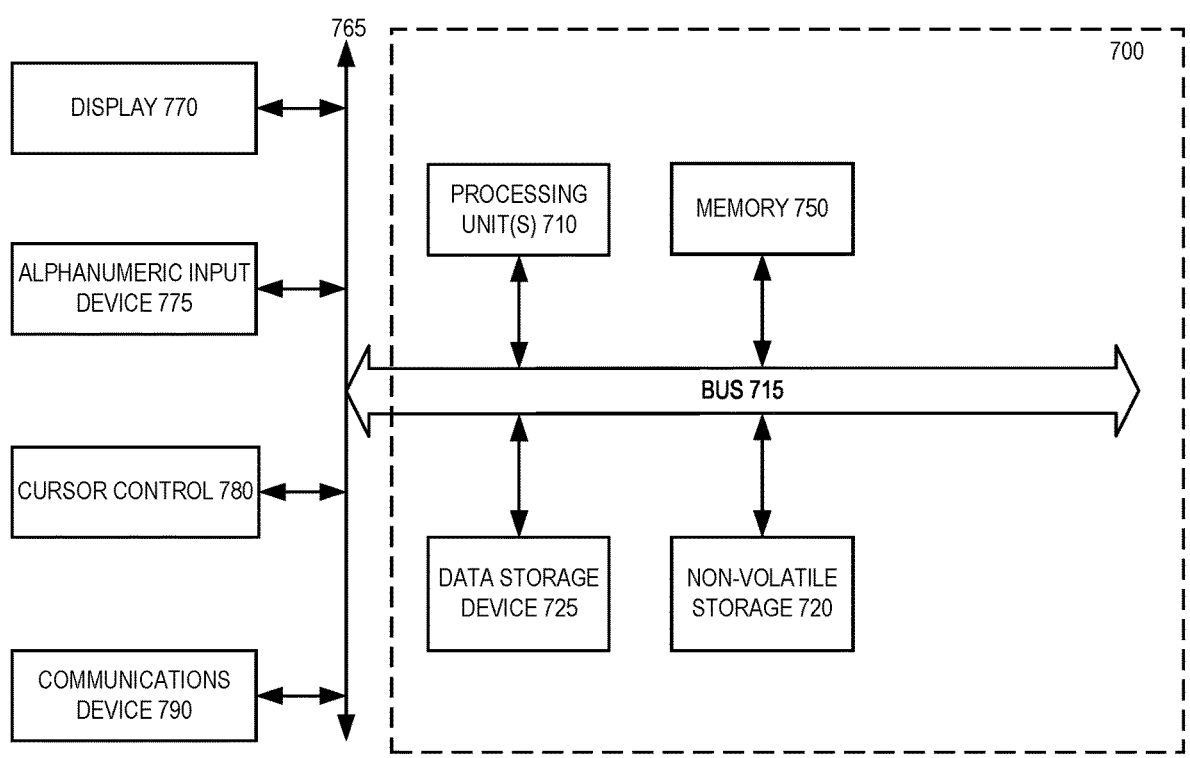
FIG. 7 is one embodiment of a computer system that may be used to support the systems and operations discussed herein.

In one embodiment, the system includes one or more reader devices 120, one or more point of sale (POS) devices 130, one or more merchant servers 140, one or more commerce platform servers 150, and one or more authorization network servers 160. In one embodiment, POS devices 130 may be computing devices, such as a smartphone, tablet computer, laptop computer, computerized, or other hardware device that implements a payment application of a merchant. In one embodiment, the payment application is an application that enables an employee or agent of the merchant to collect payment and complete transactions for goods or services offered by the merchant. In embodiments, the application may be a web based application served by one or more of the merchant server(s) 140 or other computer servers at the direction of the merchant. Furthermore, merchant server(s) 140, authorization network server(s) 160, and commerce platform server(s) 150 are also computing devices, such as server computers, desktop computers, etc. that include typical computing hardware, as illustrated in FIG. 7 below.

Reader device(s) 120 are also computer processing devices that are each communicatively coupled with one of the POS device(s) 130 over a wireless communications link, such as a Bluetooth, Zigbee, or other wireless communications link. Embodiments of reader devices are illustrated and described in greater detail below in FIGS. 8 and 9. In embodiments, the wireless communication link is secured by a secure protocol for the exchange of information, such as utilizing symmetric or asymmetric encryption based communications.

Figure 9:
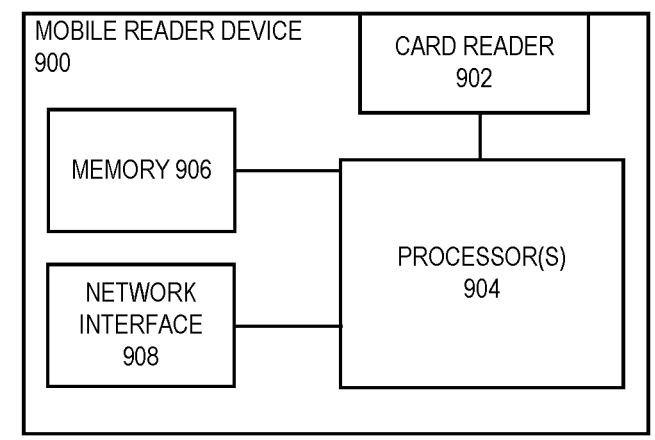
FIG. 9 is one embodiment of a mobile reader device that may be used to support the systems and operations discussed herein.

In embodiments, the reader device(s) 120 may include one or more mobile reader devices that do not include a display or other user interfaces (e.g., keys, buttons, etc.). One embodiment of a mobile reader device 900 is illustrated in FIG. 9 below. In embodiments, mobile reader device 900 interacts with the merchant's POS device 130 to which it is communicably coupled to register, discover, activate, and use the mobile reader device for performing transactions using the services of commerce platform server(s) 150, as discussed in greater detail below in FIG. 2B. A payment processor is one example of a commerce platform. In embodiments, the mobile reader device 900 can include a card reader 902 (e.g., an integrated circuit or smart chip reader, a magnetic strip reader, a near field communication reader, etc.), memory 906, a network interface 908 for establishing wireless communications links, and at least one processor 904, as well as other hardware components typically associated with mobile reader devices.

Figure 8:
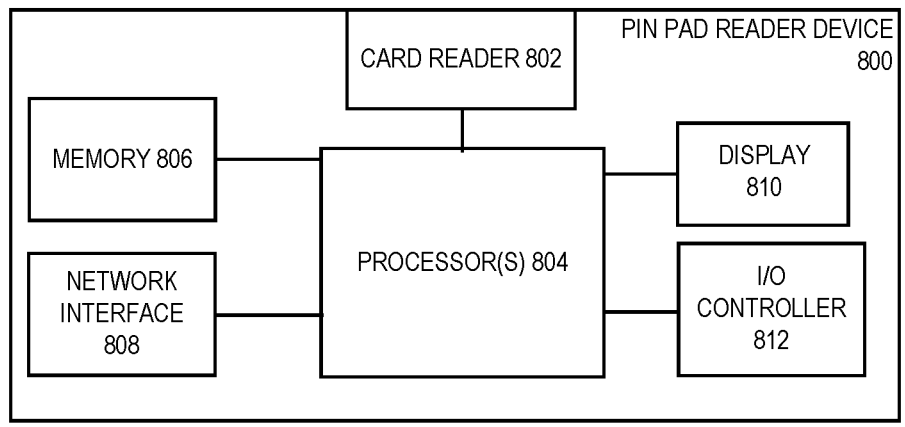
FIG. 8 is one embodiment of a PIN pad reader device that may be used to support the systems and operations discussed herein.

In embodiments, the reader device(s) may include one or more personal identification number (PIN) pad reader devices, such as PIN pad reader device 800 illustrated in FIG. 8. In one embodiment, PIN pad reader device includes display 810 (e.g., an LCD, LED, or other display screen), an I/O controller 812 for communicating user input that a user of the PIN pad reader device provides during the completion of a transaction, such as input from buttons, touch pads, as well as other user interface components, to a merchant POS device 130 via network interface 808. PIN pad reader device 800 may also include a memory 806, at least one processor 804, and a card reader 802. Furthermore, PIN pad reader device may also include local area network, wide area network, or other network communications connectivity, established by network interface 808, for exchanging communications with remote systems over a network.

Furthermore, the reader device(s) illustrated in FIG. 1 can include a mixture of different kinds of reader devices each communicatively coupled with different merchant POS devices. Furthermore, additional types of reader devices may be used instead of, or in addition to, the PIN pad reader devices and the mobile reader devices discussed herein. In any embodiment, the reader device(s) are responsible for collecting consumer payment card data (e.g., EMV card data) by scanning a magnetic strip, reading an integrated circuit, receiving user input, etc. from or associated with a payment card 110.

Once card data 110 is read by a reader device 120, the card data is provided by the reader device to the commerce platform server(s) 150 for performing one or more payment processing operations. In an embodiment, this can include one or more of tokenizing, authorizing, and/or approving one or more financial aspects associated with the transaction. In embodiments, a PIN pad reader device may interact with commerce platform server(s) using network connectivity of the PIN pad reader device, as discussed in greater detail below in FIG. 2A. In other embodiments, a mobile reader device uses a mobile software development kit (SDK) installed and executing on a merchant POS device to which the mobile reader device is communicatively coupled to interact with commerce platform server(s), as discussed in greater detail below in FIG. 2B. In either embodiment, the mobile SDK or the direct communications between a PIN pad reader device and commerce platform server(s) handles any received card data in such a way that it is not exposed to any merchant system thereby preventing merchant software or merchant POS device(s) 130 running a POS checkout application or the merchant server(s) 140 from being subject to the scope of PCI compliance requirements. Instead, a token is generated by commerce platform server(s) 150 after authorizing a transaction with authorization network server(s) 160 (e.g., card brand systems, issuing bank systems, etc.), and the token provided form the reader device 120 to the merchant POS device 130. The merchant's POS checkout application may then use the token authorizing the transaction to complete the transaction, and further provide the token to merchant server(s) 140 for subsequent use in obtaining remuneration identified by the token by interacting with the commerce platform server(s). One embodiment for using reader devices 120 with merchant POS devices 130 is described in U.S. patent application Ser. No. 15/997,416, filed on Jun. 4, 2018, titled "Managed Integrated Payment Environment," the disclosure of which is incorporated by reference in its entirety. Furthermore, one embodiment of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

The merchant POS device(s) 130, merchant server(s) 140, commerce platform server(s) 150, authorization network server(s) 160, and embodiments of the reader device(s) 120 may be coupled to a network 102 and communicate with one another using any of the standard protocols for the exchange of information. In one embodiment, one or more of the merchant POS device(s) 130, merchant server(s) 140, commerce platform server(s) 150, authorization network server(s) 160, and embodiments of the reader device(s) 120 may run on one Local Area Network (LAN) and may be incorporated into the same physical or logical system, or different physical or logical systems. Alternatively, one or more of the merchant POS device(s) 130, merchant server(s) 140, commerce platform server(s) 150, authorization network server(s) 160, and embodiments of the reader device(s) 120 may reside on different LANs, wide area networks, cellular telephone networks, etc. that may be coupled together via the Internet but separated by firewalls, routers, and/or other network devices. In one embodiment, commerce platform server(s) 150 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. Furthermore, in embodiments, merchant POS device(s) 130, merchant server(s) 140, commerce platform server(s) 150, authorization network server(s) 160, and embodiments of the reader device(s) 120 may communicate with one another via network 102 using any of the protocols for the exchange of information, such as secure protocols including TLS, SSL, SSH, etc.

Reader Device Registration, Discovery, Activation, and Use

In one embodiment, a merchant may obtain a new reader device for use by employees and/or agents of the merchant. This typically occurs when an existing reader device breaks or a new reader device is needed for use by new employees. In embodiments, a commerce platform (e.g., the commerce platform providing payment services via commerce platform server(s) 150) sends the new reader device to the merchant for deployment at a location associated with the merchant (e.g., a store, kiosk, etc. having a physical real world location). However, before the new reader device can be used for performing financial transactions as discussed herein, registration, discovery, and activation of the new reader device are performed so that the new reader device can interact with a merchant POS device via a wireless communications link, trust is established in the new reader device, and communication between devices is secured.

Figure 2A:
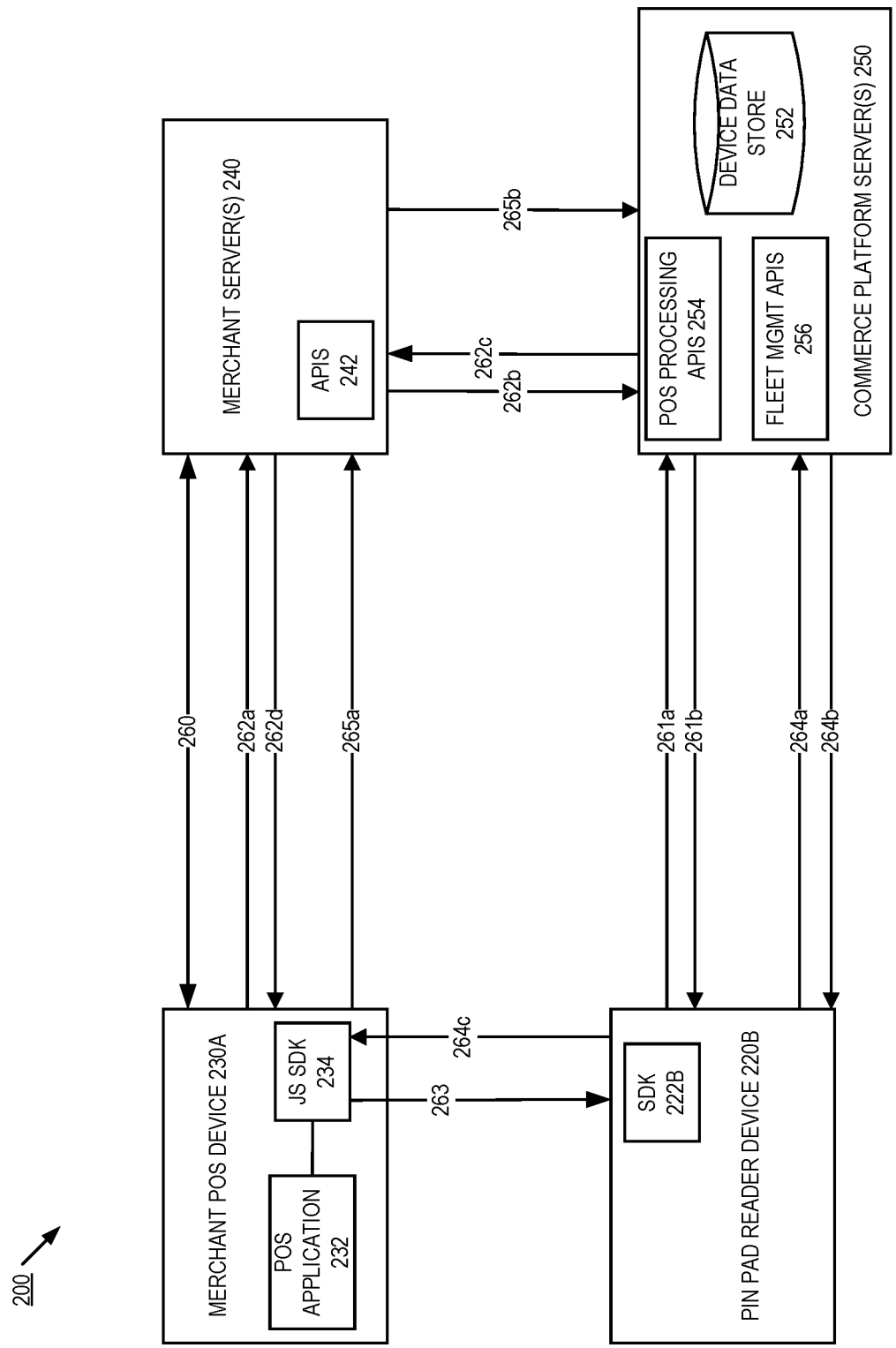
FIG. 2A is a block diagram of one embodiment of registering, discovering, activating, and using PIN pad reader devices performed by a PIN pad reader device, a POS device, merchant server(s), and commerce platform server(s).

In one embodiment, an embodiment 200 of a process and system for registering, discovering, activating, and using a new PIN pad reader device is illustrated in FIG. 2A. In embodiments, the PIN pad reader device 220A, merchant POS device 230A, merchant server(s) 240, and commerce platform server(s) 250 provide additional detail for the reader device(s) 120, merchant POS device(s) 130, merchant server(s) 140, and commerce platform server(s) 150 discussed above in FIG. 1.

In embodiments, the process for registering, discovering, and activating a PIN pad reader device is performed by processing logic of a PIN pad reader device, a merchant POS device, one or more merchant server(s), and one or more commerce platform server(s). The processing logic may comprise hardware (circuitry, dedicated logic, etc.), software (such as is run on a general purpose computer system or a dedicated machine), firmware, or a combination for performing the operations discussed herein. For example, the processing logic can reside in functions of a software development kit (SDK) 222A providing software for operating PIN pad reader device 220A, functions of a javascript (JS) SDK 234 providing functions for us by a POS application 232, application programming interface(s) executing on a merchant server(s) 240, and one or more sets of APIs (e.g., POS processing APIs 254 and fleet management APIs 256) executing on commerce platform server(s) 250. In embodiments, the SDKs and APIs are software packages, libraries, function, routines, etc. generated and distributed by commerce platform server(s) for seamlessly implementing financial transaction operations using the services of commerce platform server(s) 250.

Initially, at operation 260, merchant POS device 230A authenticates a user to the merchant server(s) 240, for example by supplying a received user name and password, biometric data, or other authentication data to the merchant server(s) 240 to log in or otherwise authenticate a registered merchant user to merchant POS device 230A. Typically, this will occur when a user signs onto the merchant POS device 230A for use of the device during transactions on behalf of the merchant. This authentication serves to confirm the identity of the merchant's employee/agent and a location (e.g., a location of a merchant store, kiosk, showroom, etc.) where the user is located, for example by a merchant association of the merchant POS device 230A with a merchant store location.

At operations 261a, the PIN pad reader device 220A is powered on, and when the SDK 22B determines it is not paired with any merchant POS device, such as by querying a memory of PIN pad reader device 220A for registration information, device profile information, etc., the PIN pad reader device 220 transmits a request over a communication network for a registration code to commerce platform server(s) 250, which may be encrypted with one or more encryption keys provisioned by commerce platform server(s) 250 to PIN pad reader device 220A, or secured by other secure communication protocols. In one embodiment, the request includes a device information object that represents each unique reader device (e.g., PIN pad reader device) to be tracked by commerce platform server(s), and can include information such as a class of the reader device, a universal reader device identifier, an IP address of the reader device, hardware version running on the reader device, operating system running on the reader device, etc.

The commerce platform server(s) 250, in operation 261b, generate and transmit a response to the PIN pad reader device 220A with the requested registration code. In one embodiment, the registration code is a three-word phrase, such as "BLUE SOFA DOG" or "MOUSE RED RUN." The three-word phrase is globally unique and associated with the PIN pad reader device by the commerce system based on one or more device identifiers (e.g., serial number and IP address of the PIN pad reader device), as well as other information, transmitted by the PIN pad reader device 220A in the registration code request (e.g., from the device information object). In embodiments, the words used in the code are selected so as to be easy for a user to remember. The three-word code is then displayed on a display of the PIN pad reader device 220A. In embodiments, other registration codes may be used consistent with the discussion herein, for example, phrases of different lengths, a numerical code or series of numerical codes, a displayed symbol, a combination of codes, as well as other types of registration codes.

Furthermore, in embodiments, responsive to receiving the device information object in a registration request, operation 261b may optionally include commerce platform server(s) 250 causing one or more updates to be performed on PIN pad reader device 220A based on information in the device information object, for example, to update out-of-date version of an operating system of the reader device. Thus, operation 261b may also include software updates, configuration updates, etc.

At operation 262a, response to receipt of a registration code entered by a user at merchant POS device 230A, merchant POS device 230 generates and transmits by the JS SDK 234 the entered code. As discussed herein, the JS SDK 234, in embodiments, is a set of APIs and functions used by the merchant POS device 230A to complete financial transactions using the services provided by the commerce platform server(s) 250. In embodiments, the transmission of the registration code can be encrypted, and will specify what merchant, merchant account, POS device, etc. the PIN pad reader device 220A is to be registered to. In embodiments, the JS SDK 234 is software provided by the commerce platform and used by the POS application 232 on the merchant POS device 230A during financial transactions. Furthermore, in embodiments, the JS SDK 234 enables token based transactions, as discussed herein, to prevent the POS application 232 and the merchant server(s) 240 from PCI compliance requirements, as discussed herein. The merchant server(s) 240 proxy the purported registration code as well as other data (e.g., device identifiers of the PIN pad reader device 230A, merchant identifiers, commerce system account identifiers, a location of the PIN pad reader device 230A, a request to associate a merchant's custom name and/or label the PIN pad reader device 230A, etc.) to commerce platform server(s) 240 at operation 262b.

The commerce platform server(s) 250, responsive to receiving the registration request including at least the registration code from the merchant server(s) 240, perform a look up of device status based on the registration code (e.g. new device, existing device, etc.) to determine if the received code matches the code previously sent to the PIN pad reader device 220A. When the registration code is confirmed (e.g., matches) for the PIN pad reader device 220A seeking registration, commerce platform server(s) 250 add a data object to a device tree maintained in the device data store 252, which associates the identified PIN pad reader device 220A to the requesting merchant and the merchant location, and connects the PIN pad reader device 220A as an authorized device in an account for the merchant maintained by the commerce platform server(s) 250. As will be discussed in greater detail below, the reader devices added to the device tree by merchant and location enable the merchant to monitor real time status of their reader devices as a whole, at individual locations, as well as current configuration options of individual devices, and then to perform real time configuration updates on demand to various groups, fleets, and individual reader devices.

Commerce platform server(s) 250 then return, at operation 262c, an activation token to merchant server(s) 240 that again proxies, at operation 262d, the activation token to merchant POS device 230A. In embodiments, the activation token can include an encryption key for use by the PIN pad reader device 220A when performing financial transactions, such as encrypting card data collected from a customer of the merchant during a first use of the PIN pad reader device 220A. Furthermore, upon activation, configuration options can be returned to the PIN pad reader device 220A based on configurations set by the merchant, as discussed in greater detail below with respect to fleet management in FIGS. 5 and 6.

After the PIN pad reader device 220A is registered, a user using the merchant POS device 230A may seek to discover which reader devices are available to pair with the merchant POS device (e.g., form a wireless communications connection). In one embodiment, using the communications and communications channels from operations 262a-262d, merchant POS device 230A can transmit requests and receive responses from commerce platform servers(s) 250 for a list of reader devices registered to the location where the merchant POS device 230A is located, including PIN pad reader device 220A (e.g., which has successfully completed registration). When the PIN pad reader device 220A is on the list of registered reader devices, merchant POS device 230A and PIN pad reader device 220A may form a communications link (e.g., a Bluetooth or other personal area network connection in response to a connection request of a user of the merchant POS device). Merchant POS device 230A then responds to the pairing request by providing PIN pad reader device 220A a scoped encryption key (e.g., an advanced encryption standard 128, 192, or 256-bit encryption key, or other encryption key). In embodiments, the scoped encryption key is a key that PIN pad reader device can use to perform some, but not all, operations for completing a financial transaction using commerce platform server(s) 250. For example, the scoped key may include the ability to provide captured card data to the commerce platform server(s) 250 in encrypted form. However, data encrypted by the scoped key does not have sufficient authority to, for example, transfer money to/from an authorization network server(s). Instead, a key with a different scope (e.g. a key of the merchant server(s) 240) can be used for functions, such as transferring money. In embodiments, a new scoped encryption key is generated by the commerce platform server(s) 250 and provided to the PIN pad reader device 220A using the communication channels 262a-262d each time discovery and pairing is performed for the PIN pad reader device 220A. Furthermore, the scoped key may be indexed such that the commerce platform server(s) 250 can look up a corresponding key to decrypt data that uses the key provided to the PIN pad reader device 220A, to determine the scope of actions associated by the key, and to determine whether a key is still active for time-bound or short lived keys.

After pairing, the PIN pad reader device 220A can be activated by merchant POS device 230A when the merchant POS device 230A provides the PIN pad reader device 220A a transaction encryption key generated by the JS SDK 234. In one embodiment, commerce platform server(s) 250 responds to activation requests by establishing trackable objects that represents the PIN pad reader device (e.g., based on one or more device identifiers of the PIN pad reader device 220A) and assigns an active session to the object, which may be maintained in device data store 252. For tokenized transactions, the tokens generated by commerce platform server(s) 250 in response to transaction authorizations and returned to the PIN pad reader device (e.g., operations 264a-264b) may be encrypted using the scoped encryption key. Then the token provided to the merchant POS device 230A using the transaction type key. Furthermore, in embodiments, the transaction key may also be scoped, which limits what types of transactions can be performed by the merchant POS device 230A using the PIN pad reader device 220A.

In embodiments, registration may occur once per location, but discovery and activation occurs each time the PIN pad reader device 220A is powered on, location of the PIN pad reader device changed, etc. Furthermore, the embodiments discussed above ensure that the PIN pad reader device 220A is registered to a location and known to the commerce platform server(s) 250 prior to being able to be paired to a merchant POS device 230A. Additionally, the usage of scoped and transaction encryption keys ensure that the data transferred between the PIN pad reader device 220A and other systems is protected before the information leaves the PIN pad reader device 220A. Further, the process of registration, discovery, and activation is simple and efficient for the merchant's users (e.g., employees and/or agents) to complete, based on the various communications discussed above, as enabled by the illustrated POS processing APIs, APIs of the merchant and JS SDK of the merchant POS device that are both provided from the commerce platform, and the SDK running on the PIN pad reader device. Beneficially, the registration, discovery, and activation can be completed without requiring any specialized knowledge on behalf of the merchant's user.

After activation, the PIN pad reader device 220A can be used to capture card data during a transaction between a merchant and a customer. The POS application on the merchant POS device 232, at operation 263, creates a transaction and transmits an instruction to the PIN pad reader device 263 to capture card data for a transaction and a requested amount for the transaction. In one embodiment, the merchant POS device 230A receives input from a user that specifies the transaction amount, which the JS SDK uses to construct a payment intent object. In embodiments, the payment intent object is a data structure, data object, etc. defined by the JS SDK 234 and understood by the SDK 222A that holds data including at least the transaction amount and merchant identifiers. A reader of the PIN pad reader device 220 is activated by the SDK 222A in response to receipt of the request from the merchant POS device including the payment intent object, and card data of the customer is captured by a card data reader of the PIN pad reader device 220A, which is attached to the payment intent object by the SDK 222A running on the PIN pad reader device 220A.

The SDK 222A running on the PIN pad reader device 220A, at operation 264a encrypts using the scoped encryption key and transfers the encrypted card data encrypted to the commerce platform server(s) 250 in a request that the transaction be authorized in the requested amount as specified by the payment intent object. In embodiments, responsive to a merchant's customer confirming the payment amount, the payment intent object is transmitted to the commerce platform server(s) 250 by the PIN pad reader device 220A. The POS processing APIs 254 decrypt the card data by matching received PIN pad reader device identifiers to a corresponding scoped encryption key, and clear the transaction with one or more authorization server(s) (e.g., card brand and issuing bank server(s)). When the transaction is cleared, a return authorization is generated by commerce platform server(s) 250 and transmitted to PIN pad reader device, at operation 264b, in the form of a token (e.g., a unique identifier), that is then provided (again in encrypted form using the transaction encryption key) to the merchant POS device 230A at operation 264c.

The JS SDK 234 receives the token authorizing the transaction and decrypts the token to obtain an authorization code, an authorized amount, time, location, last 4 digits of card charged, as well as other transaction data that can be provided to the customer in a transaction receipt. Furthermore, the JS SDK 234 may further proxy a request via merchant server(s) 240 to commerce platform server(s) 250 to determine that the token corresponds to a transaction that has been posted (e.g., funds and card data have been successfully captured by commerce platform server(s)).

The JS SDK 234, at operation 265a provides the token (in encrypted form) to the merchant server(s) 240, which uses API(s) 242 to forward the token periodically, as a batch with other tokens, or immediately in response to receiving the token, etc. to commerce platform server(s) 250 at operation 265b. In embodiments, the token is encrypted by the merchant server(s) 240 with an encryption key having sufficient scope to enable the transfer of money between banks/card authorization servers and banks associated with the merchant.

In embodiments, the series of communications exchanged during a transaction are not only for completing a transaction, but also for ensuring cardholder security at each step of the communication exchange. For example, cardholder data is encrypted before leaving the PIN pad reader device 220A to the commerce platform server(s) 250, and further tokens authorizing transactions are also encrypted before leaving the PIN pad reader device 220A to the merchant POS device 230A using a different, transaction key. Additionally, customer card data is not provided to devices of the merchant at any time to prevent the merchant from being subject to PCI compliance requirements.

Figure 2B:
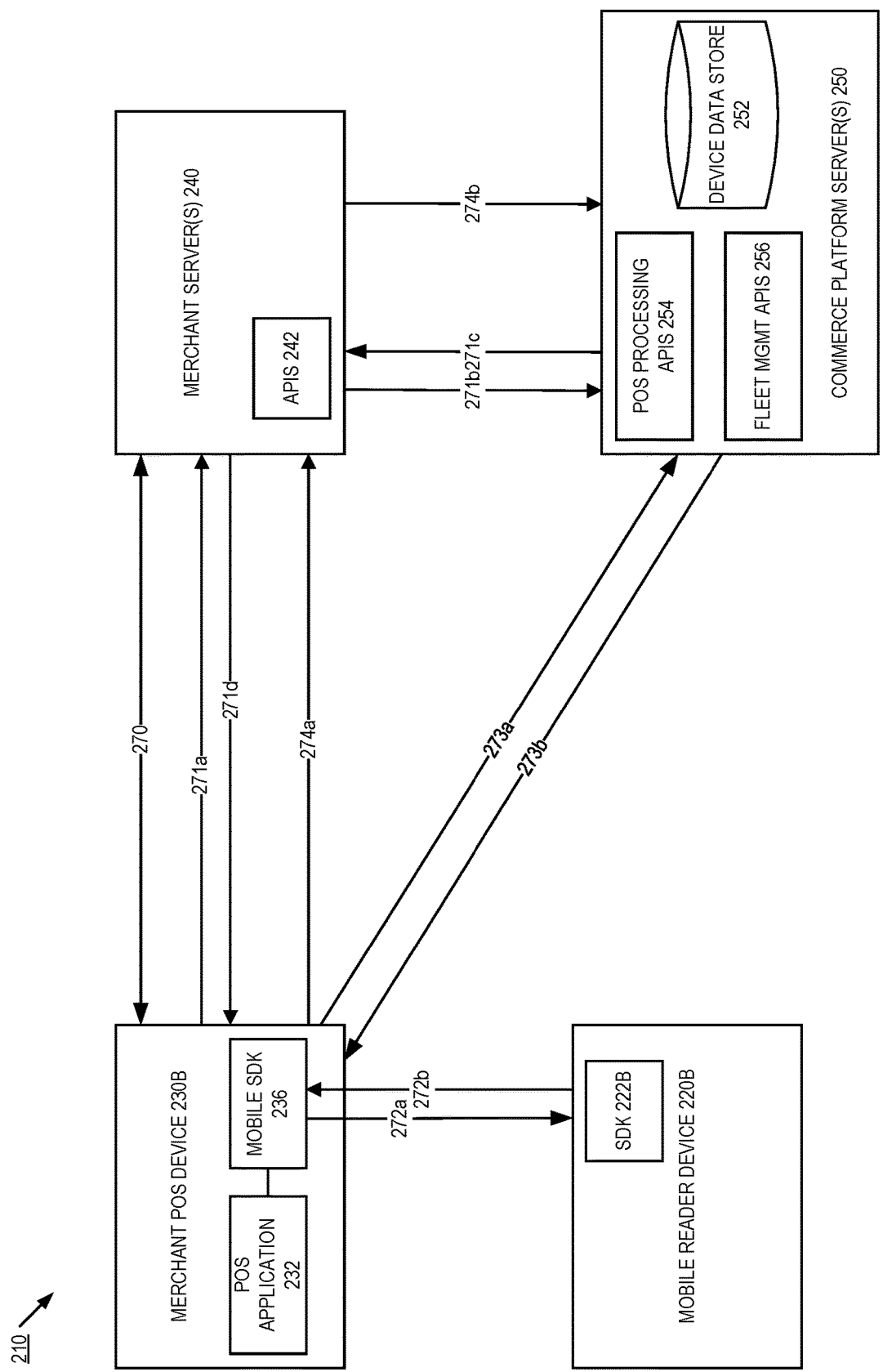
FIG. 2B is a block diagram of one embodiment of registering, discovering, activating, and mobile reader devices performed by a mobile reader device, a POS device, merchant server(s), and commerce platform server(s).

FIG. 2B illustrates another embodiment 210 of registration, discovery, activation, and usage of reader device including a mobile reader device. In embodiments, the PIN pad reader device 220A, merchant POS device 230B, merchant server(s) 240, and commerce platform server(s) 250 provide additional detail for the reader device(s) 120, merchant POS device(s) 130, merchant server(s) 140, and commerce platform server(s) 150 discussed above in FIG. 1.

In embodiments, the process for registering, discovering, and activating mobile reader device 220B is performed by processing logic of a mobile reader device, a merchant POS device, one or more merchant server(s), and one or more commerce platform server(s). The processing logic may comprise hardware (circuitry, dedicated logic, etc.), software (such as is run on a general purpose computer system or a dedicated machine), firmware, or a combination for performing the operations discussed herein. For example, the processing logic can reside in functions of a software development kit (SDK) 222B providing software for operating mobile reader device 220B, functions of a mobile SDK 236 providing functions for use by a POS application 232, application programming interface(s) 242 executing on a merchant server(s) 240, and one or more sets of APIs (e.g., POS processing APIs 254 and fleet management APIs 256) executing on commerce platform server(s) 250. In embodiments, the SDKs and APIs are software packages, libraries, function, routines, etc. generated and distributed by commerce platform server(s) for seamlessly implementing financial transaction operations using the services of commerce platform server(s) 250.

As illustrated in FIG. 2B, mobile reader device 220B is a mobile reader device (e.g., mobile reader device illustrated in FIG. 9) that does not have the network communication abilities to communicate directly with the commerce platform server(s), and also lacks the user interface components of the PIN pad reader device. 220A In embodiments, the registration, discovery, activation, and usage of the mobile reader device in FIG. 2B operates similarly to FIG. 2A discussed above, except that the mobile SDK 236 operates in an isolated execution environment not accessible to the POS application 232 when handling financial transaction interactions with the commerce platform. For example, in embodiments, the isolated execution environment may be executed by a trusted execution environment of a processor of the merchant POS device 230B, where the trusted execution environment ensures security, isolation, and confidentiality from other components of the merchant POS device 230B. That is, the use of the isolated execution environment does not expose or retain data (e.g., customer card data) processed within the isolated execution environment, as if it was processed on a different device. As discussed herein, by not allowing the merchant POS device 230B access to card data of a customer, the techniques discussed herein prevent PCI compliance requirements being placed on the POS application 232, merchant POS device 230B, or merchant server(s) 240.

Thus, similar to the discussion above, at operation 270, a user of merchant POS device is authorized by merchant server(s) 240. The POS application 232 through the mobile SDK 236 requests the activation token for device registration, which is proxied to/from the commerce platform server(s) 250 via the merchant server(s) 240 APIs 242, at operations 271a-271d similar to the discussion above. The POS application 232, through the mobile SDK 236 then discovers and pairs the mobile reader device 220B to complete activation, at operations 272a-272b, including receiving a scoped encryption key generated by commerce platform server(s) 250 and a transaction encryption key generated by mobile SDK 236. A tokenized transaction can then be completed via communications between the mobile SDK 236 of the merchant POS device 230B and the POS processing APIs 254 of the commerce platform server(s) 250, where all sensitive customer information captured and encrypted by mobile reader device 220B is handled within the isolated execution environment used by mobile SDK 236, and where customer information is never exposed to the merchant POS device 230B or POS application 232 in unencrypted form, thereby insulating the systems from PCI compliance requirements. A returned authorization for the transaction (e.g., operation 273b) can then be used by merchant POS device 230B to provide a customer with a receipt, complete the transaction, and seek remuneration by the merchant server(s) at operations 274a-274b.

Figure 3:
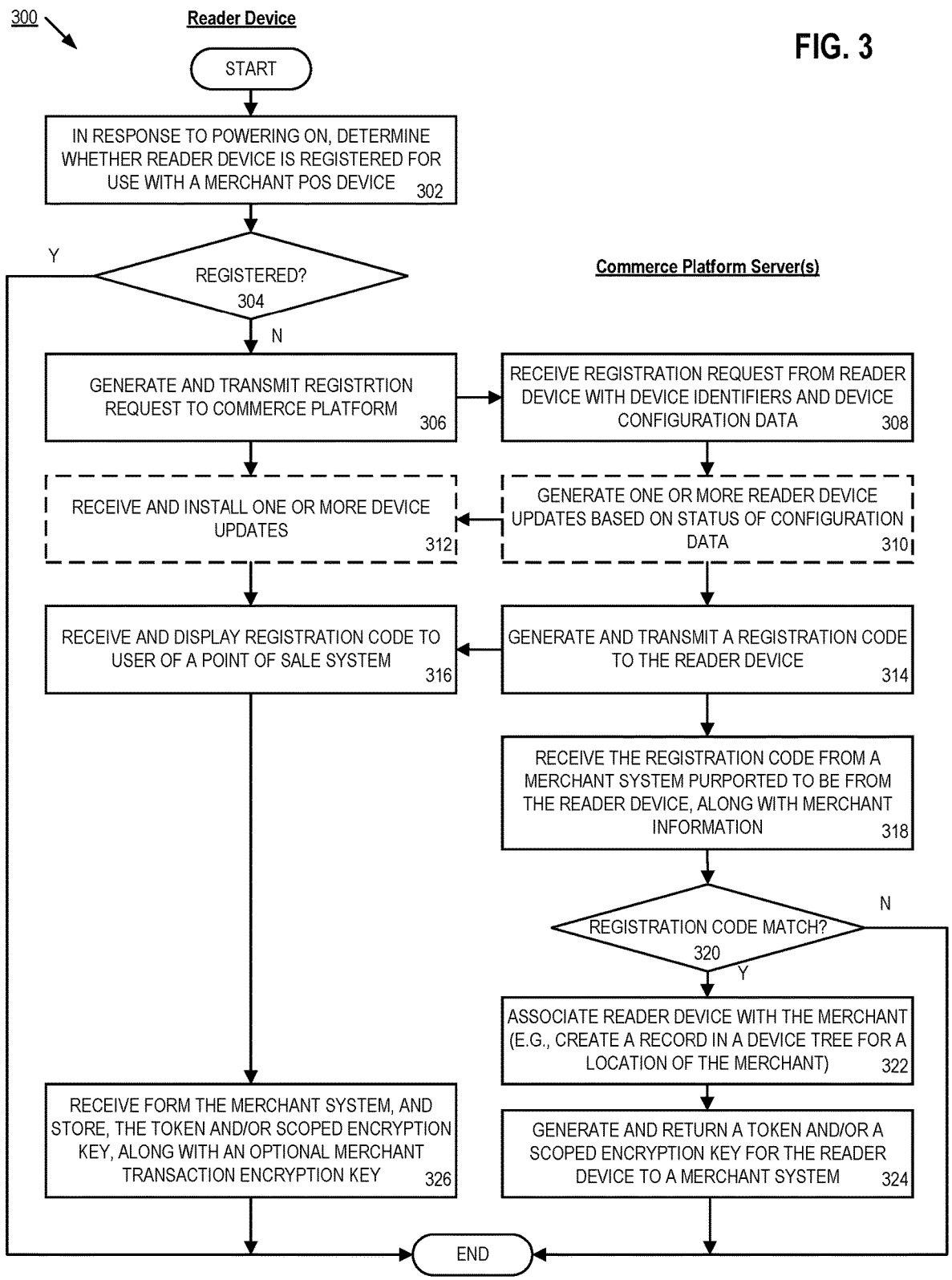
FIG. 3 illustrates one embodiment of a method for registering a reader device for a merchant using a commerce platform.

FIG. 3 illustrates one embodiment of a method 300 for registering a reader device for a merchant using a commerce platform. The method 300 is performed by processing logic that may comprise hardware (circuitry, dedicated logic, etc.), software (such as is run on a general-purpose computer system or a dedicated machine), firmware, or a combination thereof. In one embodiment, the method 300 is performed by a reader device and commerce platform server(s) (e.g., reader device 120, 220A, or 220B and commerce platform server(s) 150 or 250).

Referring to FIG. 3, processing logic of the reader device begins by determining whether the reader device is registered for use with a merchant POS device (processing block 302). Processing logic may access memory of the reader device to determine whether an activation token has been received previously, as discussed herein, such as when the reader device is powered on. When registered (processing block 304), the process ends and a pairing and activation process may be performed, as discussed in FIG. 4 below. However, when not registered (processing block 304), processing logic of the reader device generates and transmits a registration request to a commerce platform including at least one or more device identifiers (processing block 306), such a unique device ID, IP address, device name, etc. In embodiments, the registration request can include additional reader device information, such as current software and hardware configuration settings. As discussed in greater detail herein, the configuration settings can be updated during registration and/or during use according to merchant requests, present commerce configurations, present merchant configurations, etc.

Processing logic of the commerce platform server(s) receive the registration request form the reader device with the device identifiers and the optional configuration data (processing block 308). Optionally, and based on the received configurations (e.g., a more up to date operating system, SDK, lack of hardware/software compatibility, etc.), processing logic of the commerce platform server(s) may optionally generate and transmit one or more reader device updates (processing block 310). In embodiments, the updates may include instructions causing processing logic of the reader device to install the received one or more device updates (processing block 312).

Processing logic of the commerce platform server(s) then generates and transmits a registration code to the reader device (processing block 314). As discussed herein, the code may be a three-word code, an alphanumeric code, a visual code, etc.

Responsive to receiving the code, processing logic of the reader device displays the registration code to a user of the point of sale system of a merchant (processing block 316). In embodiments, a PIN pad reader device may display the code on a display of the reader device itself. In other embodiments, a mobile reader device may forward the code to a merchant POS device to have the merchant POS device display the code.

In either embodiment, processing logic of the commerce platform server(s) receive the registration code from a merchant system purported to be from the reader device, along with merchant information (processing block 318). In embodiments, processing logic uses the receipt from a merchant system, and not from the reader device, as a second factor of identity authentication. That is, the code was provided to a reader device, and then received from a merchant system (e.g., entered into a merchant POS device by a merchant user, and then received from a merchant server that previously authenticated the merchant user as a legitimate merchant user, as discussed herein). Thus, processing logic is able to conclude that the code was sent and entered by a user at a merchant POS device by a trusted merchant user. Furthermore, additional merchant information, such as merchant identifiers, merchant location where the reader device is located, reader device ID, etc. is also received.

When the registration code matches the code sent to the reader device (processing block 320), as determined by a matching of the received code to a sent code based on reader device ID, processing logic associates the reader device (e.g., now authenticated using multiple factors) with merchant (processing block 322). In embodiments, processing logic may create a record in a per-merchant-location device tree that stores data for each merchant device associated with a given location, and where each device record includes data describing its current configurations, settings, location, etc.

Processing logic then generates and returns a token and/or scoped encryption key for the reader device to a merchant system (processing block 324). In embodiments, the token is an activation token include data, encryption keys, etc. that commerce platform server(s), reader device, etc. can use to determine that the reader device has successfully completed registration. In embodiments, a scoped encryption key may also be returned to the reader device when the registration process also activates/pairs the reader device for use.

Processing logic of the reader device then receives, from a merchant system, the token and/or the scoped encryption key along with optional merchant transaction encryption key, which is stored in a memory of the reader device (processing block 326).

Figure 4:
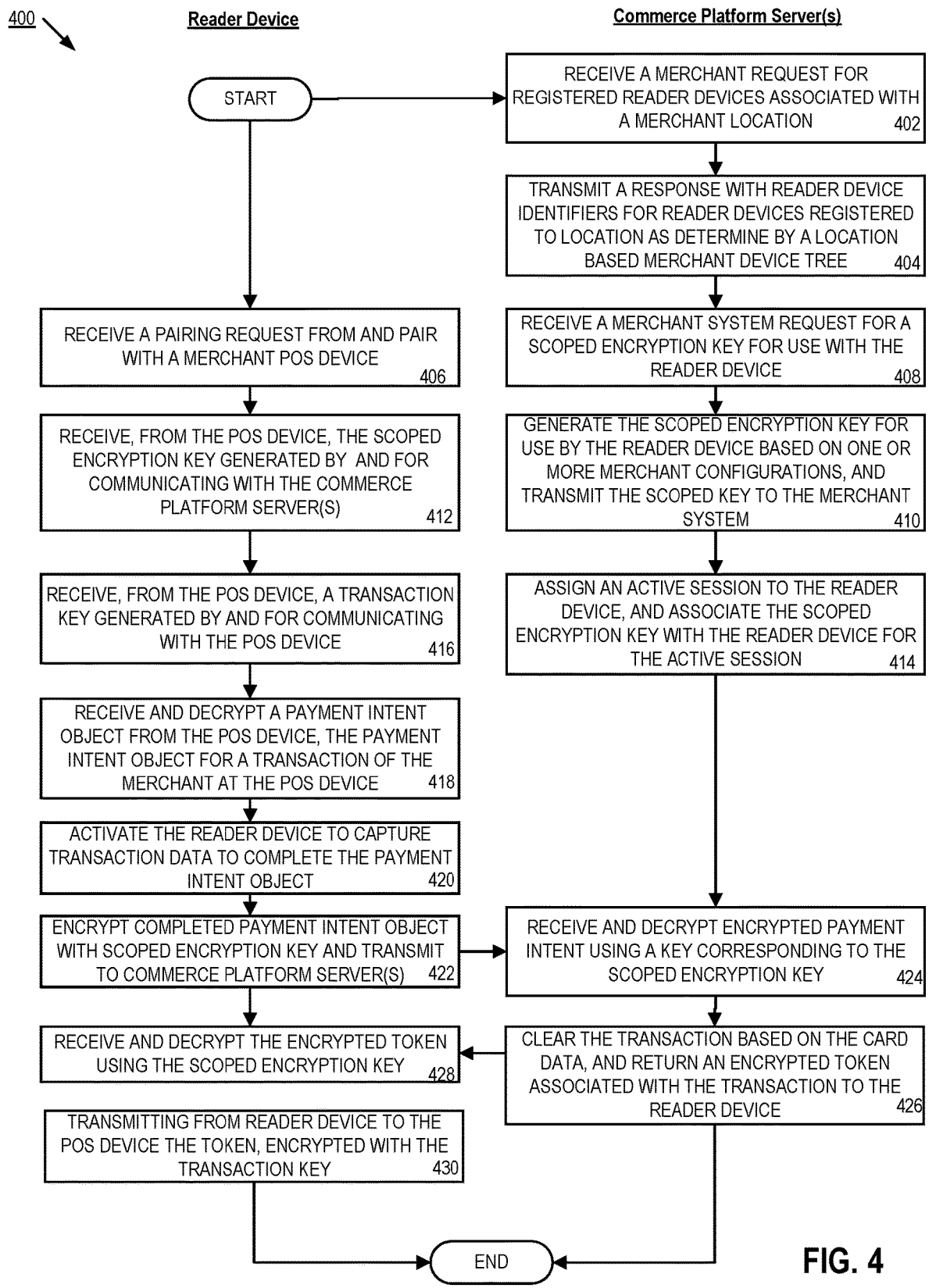
FIG. 4 illustrates one embodiment of a method for activating and using a reader device for a transaction between a merchant's POS device and a customer of the merchant.

When the registration process has been completed, a reader device may then be activated and used by a merchant for performing financial transaction using the services of a commerce platform. FIG. 4 illustrates one embodiment of a method for activating and using a reader device for a transaction between a merchant's POS device and a customer of the merchant. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by a reader device and commerce platform server(s) (e.g., reader device 120, 220A, or 220B and commerce platform server(s) 150 or 250).

Referring to FIG. 4, processing logic of the commerce platform server(s) receive a merchant request for registered reader device associated with a merchant location (processing block 402). In embodiments, the request may be received in response to a merchant system performing a device pairing operation at a location of the merchant. Processing logic then transmits a response with reader device identifiers for reader devices that have been registered to the location using a location based merchant device tree (processing block 404). That is, processing logic utilizes the received merchant location to query device trees associated with the merchant to determine all devices associated with a given location. After providing the results of devices registered to a merchant's location, processing logic further receives a request for a scoped encryption key to be associated with one of those devices (e.g., a device to be paired with a merchant's POS device) (processing block 408). Processing logic generates the scoped encryption key, which may be scoped based on default merchant configurations, merchant configurations by location, default permissions, specific permission associated with the merchant location, configurations/permissions associated with a specific reader device, etc., and returns the generated key to the requesting merchant system (processing block 410). Processing logic may then assign an active session to the reader device, and associate the scoped encryption key with the reader device for he active session (processing block 414).

In embodiments, while processing blocks 402-414 are occurring, processing logic of the reader device, in a pairing operation, may receive a pairing request from and then pair with a merchant POS device (processing block 406). Such a request, as discussed herein, as accompanies by the acquisition of a scoped encryption key generated by commerce platform server(s) and for communication with the commerce platforms server(s) which have a corresponding key (processing block 412), which processing logic of the reader device receives from a POS device to which it is to be paired (processing block 412). The reader device further receives a second encryption key, more specifically a transaction encryption key where the POS device generates the key and maintains a corresponding key, for communications between the reader device and the merchant POS device (processing block 416). After the receipt of the two keys (e.g., POS device's transaction key and commerce platform server(s) scoped encryption key), the reader device is successfully activated for use during transaction in that it may securely communicate with commerce platform servers and the merchant POS device, as discussed herein.

After activation, processing logic of the reader device receives and decrypts a payment intent object from the merchant POS device, using the transaction key, for a transaction (processing block 418). As discussed herein, the payment intent object includes information such as amount, transaction identifiers, payment type, etc., but it is incomplete as reader device is to obtain payment information by reading or otherwise capturing the data from a payment card. Processing logic therefore, activates the reader device to capture transaction data to complete the payment intent object (processing block 420).

Processing logic encrypts the completed payment intent object using the scoped encryption key, and transmits the encrypted object to the commerce platform server(s) (processing block 422). As discussed herein, the transmission of the encrypted payment intent object may be directly between the reader device (e.g., by a PIN pad reader device) or proxied via a mobile SDK executing in an isolated computing environment on a merchant POS device. In either embodiment, no sensitive customer information is exposed to the merchant t systems in unencrypted form for which the merchant system has a corresponding key, thus insolating the merchant systems from PCI compliance.

Processing logic of the commerce platform server(s) receive and decrypt the payment intent including collected card data using a key corresponding to the scoped encryption key (processing block 424). In embodiments, the reader device may include one or more device identifiers enabling processing logic to access the appropriate scoped encryption key. Processing logic may then clear the transaction using the card data, and return an encrypted token associated with the transaction to the reader device (processing block 426).

Processing logic of the reader device receives and decrypts the encrypted token using the scoped encryption key (processing block 428), which can be transmitted from the reader device to one or more merchant systems in encrypted form using the transaction encryption key (processing block 430).

As discussed above, reader devices that provide secure communication may be easily registered, discovered, and used by merchants consistent with the discussion above. Once registered, there is a technical problem of managing the various reader devices, including managing how those reader devices operate at different location with potentially different requirements. Embodiments of systems and methods for managing a fleet of reader devices are discussed in greater detail below.

Fleet Management

Figure 5:
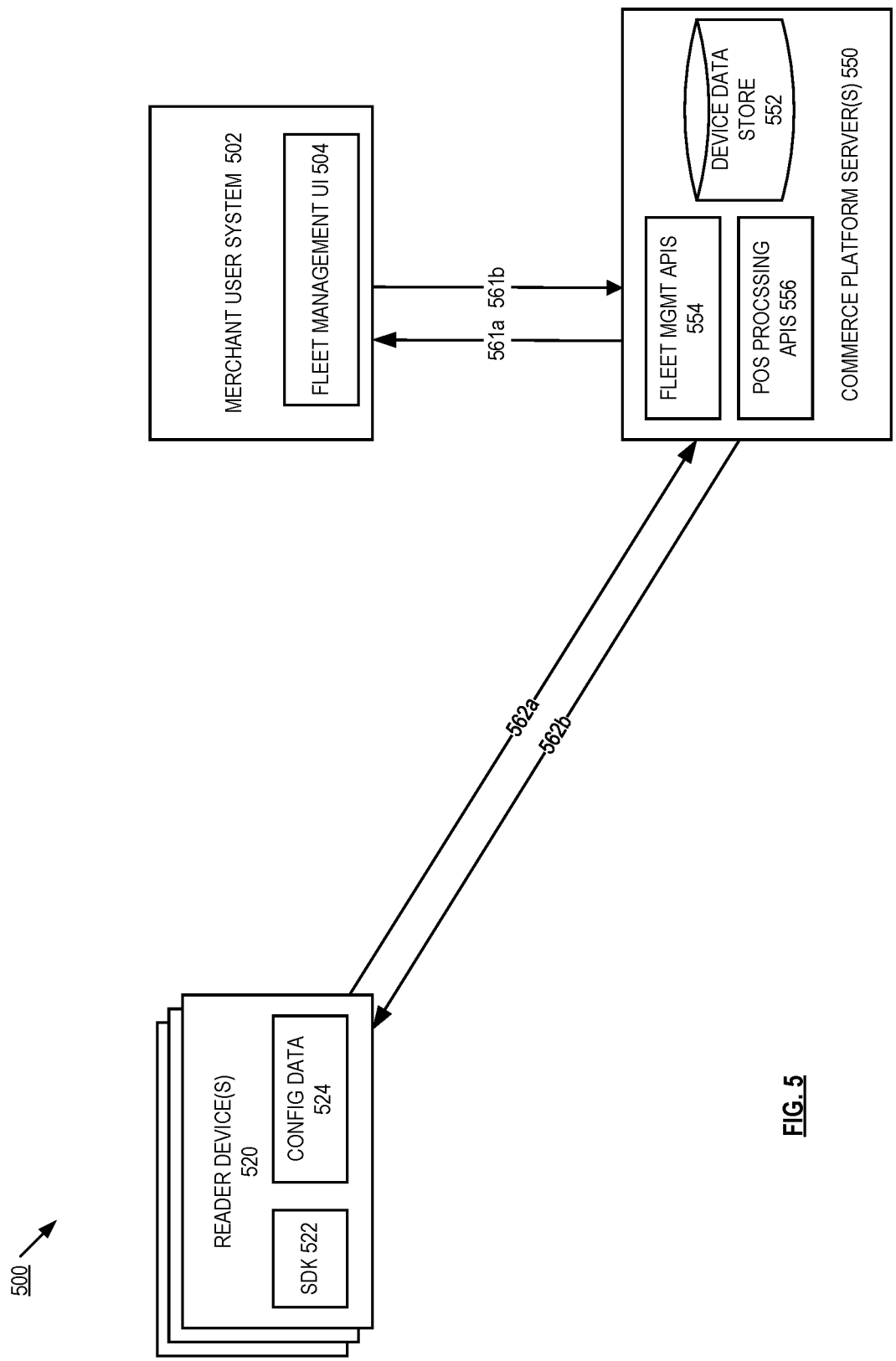
FIG. 5 is a block diagram of one embodiment of configuring and managing reader devices performed by reader device(s), a merchant user system, and commerce platform server(s)

FIG. 5 illustrates an embodiment 500 of a system of fleet management of reader device(s) 520 by a merchant user system 502 enabled by the commerce platform server(s) 550. The fleet management system is flexible, and enables a user of the merchant, via merchant user system 502 (e.g., a desktop computer, tablet, mobile app, etc.), to remotely manage a plurality of reader devices 520 (e.g., PIN pad reader devices and mobile reader devices at the same or different locations).

In the embodiments discussed above, there are several communications exchanged between the reader device(s) 520 and the merchant server(s), as well as the reader device(s) 520 and the commerce platform server(s) 550, such as user authorization messages, device registration messages, transaction processes, etc. In embodiments, device status reports may be included in one or more of those messages, or as separate periodic messages provided from the reader device SDK 522 to the commerce platform server(s) 550. The device status reports can include, for example, device health, memory usage, power, network connectivity, device serial number, version of SDK, version of an OS running on the reader device, as well as other information relevant to the health and functioning of the reader device(s) 520.

As discussed above, registration of a reader device associates an identified reader device with a merchant and a location in a reader device tree associated with the merchant and maintained by the commerce platform server(s) 550 (e.g., in device data store 552). In one embodiment, each location of a merchant has a separate reader device tree maintained in the device data store. That is there is a 1 to 1 relationship to location where each location has its own reader device tree.

In one embodiment, a current reader device status from the received status messages is maintained by fleet management APIs 554 in device data store 552 for each reader device within the reader device tree for a location of a merchant. Thus, a user of the merchant user system, such as a CTO, business administrator, IT professional, etc., can monitor the real time status of each reader device associated with the merchant via the fleet management user interface 504. In one embodiment, the fleet management user interface 504 provides a web based or application based dashboard where a user can specify one or more of location (e.g., store at location X), reader device type (e.g., mobile or PIN pad reader devices), operating system, etc. to receive real time status/health reports of the reader devices at the locations meeting the criteria. In embodiments, fleet management APIs 554 receive such requests, and respond with data to populate the fleet management UI 504 as found in the device data store 552.

In one embodiment, each reader device is configurable via the configuration data 524 stored in a memory of the reader device(s) 520. For example, the configurable characteristics can include what operating system to run, what SDK version to run, what splash screen to display, what colors to use in a user interface, how user interface elements are laid out on a display, how often to perform periodic reporting, volume of audio cues, brightness of a display screen, as well as any other configurable options of a reader device's interfaces, operating characteristics, etc. In one embodiment, device data store 552 also maintains the current configuration of reader devices, and stores the configuration in a configuration hierarchy. One embodiment of the hierarchy is shown below:

| Level 1 | Commerce platform default configuration |
| Level 2 | Platform configuration |
| Level 3 | Merchant configuration |
| Level 4 | Location configuration |
| Level 5 | Device configuration |

In embodiments, each level is stacked in order of increasing specificity, with level 1 being the most general level of configuration and level 5 being the most specific level of configuration. Furthermore, alternate and/or additional configuration levels may be used consistent with the discussion herein. In embodiments, device configuration hierarchies may be maintained and associated with device identifiers independent of the per merchant location device trees.

In embodiments, a user of merchant user system 502 can configure one or more reader devices simultaneously using the hierarchical configuration. For example, reader devices of the merchant may use commerce platform default configuration options, such as a default splash screen displayed on PIN pad reader devices. Using the fleet management UI 504, configuration option selections can be received from a user where all reader devices for Merchant X display a Merchant X specific splash screen when a device configuration specifies the device is using a specific OS version. As another example, an organization may control both Merchants X and Merchant Y, so that PIN pad reader devices of Merchant Y are configured to display a Merchant Y splash screen when running a different OS version, and Merchant Y's mobile reader devices are configured to run $OS_i$ as opposed to another OS version available to mobile readers.

Because the configuration options are hierarchical, a user of merchant user system 502 can configure all reader devices 520 associated with a merchant, even though the reader devices are at different locations, associated with different merchants controlled by the same organization, are different types of devices, are configure differently, etc. Furthermore, the hierarchical control of configuration options for reader devices in the reader device tree (by location) can be selected down to specific reader devices at a specific location and individual options configured for each device. For example, reader device 1 of a merchant at location M can be given a different splash screen (e.g., splash screen background having a picture of a bike for a PIN pad reader device that performs transactions for bike rentals) than reader device 2 of the merchant at location M (e.g., splash screen background having a picture of the Golden Gate Bridge for a PIN pad reader device that performs transactions for tour sales). Thus, granular and highly configurable remote management of reader devices within a fleet of reader devices is enabled by the commerce platform server(s) reader device tree of merchant devices associated with merchant locations, and the hierarchical configuration data maintained for each reader device within the reader device trees.

FIG. 5 illustrates an embodiment 500 a system and process for configuration of a plurality of reader device(s) 520 of a merchant from a remote merchant user system 502 using commerce platform server(s) 550.

In embodiments, the process is performed by processing logic of one or more reader device(s) 520, a merchant user system 502, and one or more commerce platform server(s) 550. The processing logic may comprise hardware (circuitry, dedicated logic, etc.), software (such as is run on a general purpose computer system or a dedicated machine), firmware, or a combination for performing the operations discussed herein.

In one embodiment, at operation 5611*a*, fleet management user interface 502 is a dashboard (e.g., web based user interface, stand along dashboard application, etc.) that receives fleet status reports from the fleet management API 554 of commerce platform server(s) 550. As discussed above, a user of the fleet management user interface 504 can select and/or query options (e.g., health status, location, reader device type, network status, etc.) to filter results of a fleet of reader device(s) 520. Based on these results, or based on other considerations, one or more configuration options settings is received by the fleet management UI 504, and those options communicated by the fleet management UI 504 to the commerce platform server(s) 550 at operation 561*b*. As discussed above, the options are hierarchical, and for example merchant specific configurations can be changed to configure all reader devices belonging to a specific merchant, location specific configurations can be changed to configure all reader devices at a first merchant location and not reader devices at different merchant locations, reader device specific configurations that can be selected to configure a specific reader device at a specific location, as well as other reader device configurations. Furthermore, the configuration options are updated in the respective reader device tree(s) maintained by the commerce platform server(s) in the device data store.

In one embodiment, the fleet management APIs 554 of commerce platform server(s) 550 generates and transmits the configuration options (including software updates as necessary) to one or more of the reader device(s) 520 to update their configuration data 524 at operation 562*a*. The configuration options are then set at the reader device(s) 520 using the SDK 522 by updating the configuration data at the reader device(s) to carry out the configuration changes, if any, that were specified in the fleet management UI 504 by a merchant user.

In one embodiment, the reader device SDK 522 then periodically provides status messages to the commerce platform server(s) 550 to update the status information in reader device data trees stored in device data store at operation 562*b*, as discussed above. By receiving this data, commerce platform server(s) 550 are able to update the device configuration hierarchies in the device data store 552, and provide the fleet management UI 504 with a current status of the reader device(s) 520 associated with a merchant in real time, or near real time, at varying levels of detail. Furthermore, from this information, a user of the merchant via the merchant user interface an use the information to, for example, monitor their locations, decide how to configure devices, personalize devices per location, personalize specific devices at a specific location, etc.

Figure 6:
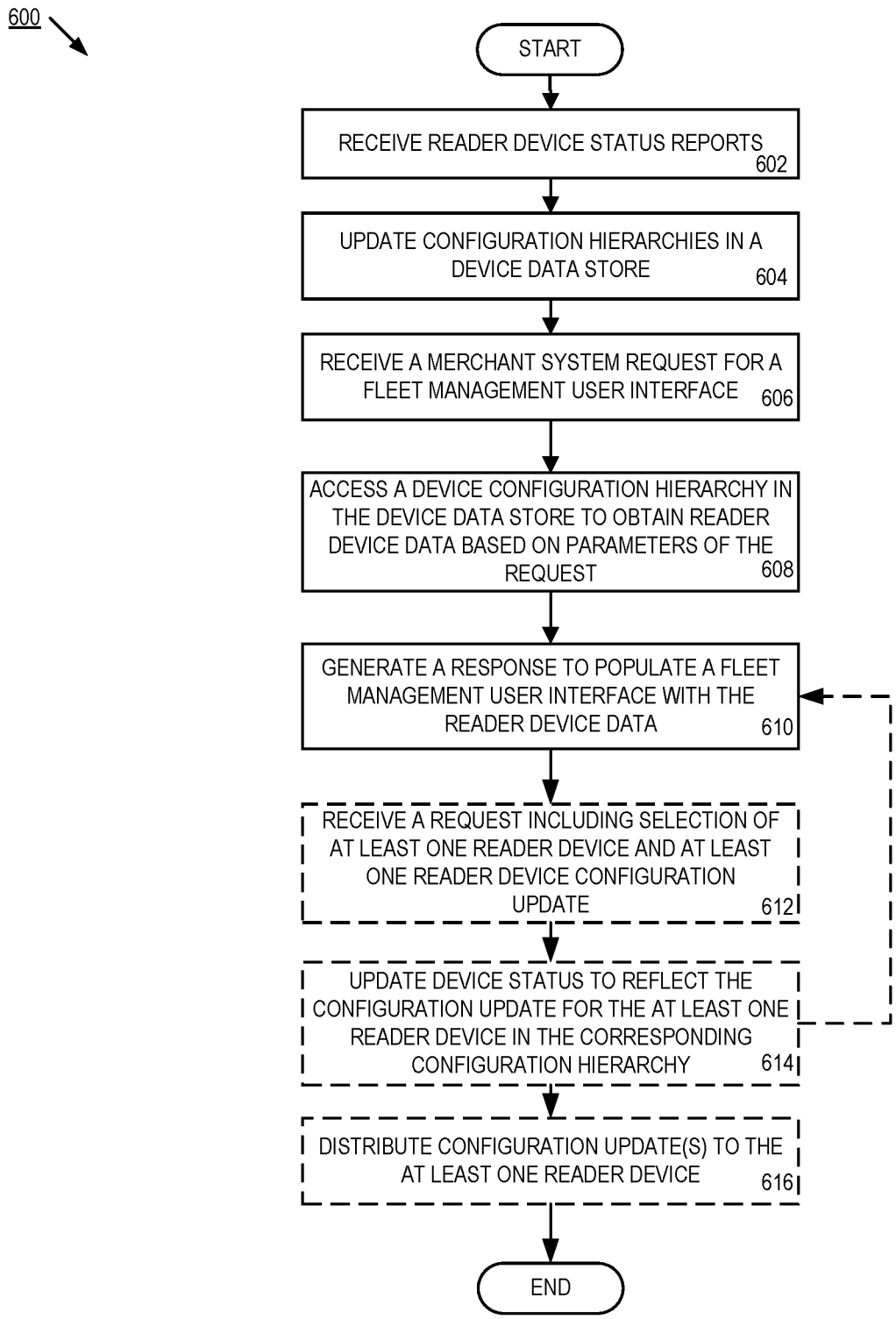
FIG. 6 illustrates one embodiment of a method for performing fleet management of reader devices.

FIG. 6 illustrates one embodiment of a method 600 for performing fleet management of reader devices. The method 600 is performed by processing logic that may comprise hardware (circuitry, dedicated logic, etc.), software (such as is run on a general-purpose computer system or a dedicated machine), firmware, or a combination thereof. In one embodiment, the method 400 is performed by a commerce platform server(s) (e.g., commerce platform server(s) 150 or 250).

Referring to FIG. 6, processing logic of the commerce platform server(s) receive reader device status reports (processing block 602). In embodiments, the status reports are received periodically, for example on a time basis (e.g., every second, every minute, every hour, every day, etc.), in response to specific events (e.g., during a transaction, at device registration, at device activation, every N transactions, etc.), as well as a combination of reporting periods.

Processing logic utilizes the reportings to update device status in device hierarchies maintained in a device data store (processing block 604). In embodiments the device hierarchies may be maintained independently of per-location merchant device trees. In embodiments, maintenance of the device hierarchies is independent of the device data trees because hierarchies and configurations may expand beyond a single merchant location (e.g., configurations to be applied across all devices associated with a merchant).

Processing logic then receives a merchant system request for a fleet management user interface (processing block 606). In one embodiment, the request specifies a merchant, organization, etc. for which the device configurations are related to, as well as additional data, such as specification of a location, specification of a device type, identification of a specific device, etc. Processing logic accesses a device configuration hierarchy in the device data store to obtain reader device data based on parameters of the request (processing block 608), and generates a response to populate the fleet management UI with the reader device data (processing block 610).

Processing logic may then optionally receive a request including selection of at least one reader device and at least one reader device configuration update (processing block 612). For example, a configuration change may be received at any level of the configuration hierarch to configure one or more reader devices. Processing logic updates the device status in the corresponding configuration hierarchy (processing block 614), and distributes the configuration update(s) to the at least one reader device (processing block 616). In embodiments, processing blocks 612-616 are illustrated in dashed line because they occur in response to configuration updates. Furthermore, the configuration updates are received remote from the reader devices being configured, ensuring ease of configuration and flexibility in how devices are configured. Beneficially, the remote configuration can be performed without special knowledge of the reader devices, and may be carried out across any number of reader devices.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and one or more processor(s) 710 coupled to the bus 715 for processing information. The system further comprises a random access memory (RAM) or other volatile storage device 750 (referred to as memory), coupled to bus 715 for storing information and instructions to be executed by processor(s) 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor(s) 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor(s) 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

FIG. 8 is a block diagram of one embodiment of a PIN pad reader device 800, and FIG. 9 is a block diagram of one embodiment of a mobile reader device 900. Each reader device provides additional details for the reader devices discussed herein. An example of the PIN pad reader device 800 is a Verifone™ PIN pad device, such as the VX 820, P400, P200, as well as other PIN pad reader devices offered by Verifone and other manufacturers of such devices. Furthermore, an example of the mobile reader device 900 is a BBPOS™ Chipper, such as the Chipper BT, the Chipper BT 2x, as well as mobile reader devices offered by BBPOS and other manufacturers of such devices.

In one embodiment, the reader devices are systems, which may include a combination of one or more processors (e.g., processor(s) 804 and processor(s) 904), a memory (e.g., memory 806 and memory 906), I/O controller (e.g., I/O controller 812), network interface (e.g., network interface 808 and network interface 908), and display (e.g., display 810), in accordance with the illustration of FIGS. 8 and 9. Each reader device may also include a number of processing modules, which may be implemented as hardware, software, firmware, or a combination. It should be appreciated that PIN pad reader device may also include, although not illustrated, a user interface (e.g., keyboard, touch-screen, buttons, or similar user input devices), a power device (e.g., a battery), as well as other components typically associated with electronic devices. Network interfaces of each reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

The memory (e.g., memory 806 and memory 804) may be coupled to processor(s) in each reader device to store instructions for execution by processor(s) (e.g., processor(s) 804 and processor(s) 904). In some embodiments, the memory is non-transitory. It should be appreciated that embodiments as described herein may be implemented through the execution of instructions, for example as stored in the memory (e.g., memory 806 and memory 906) or other element, by processor(s) (e.g., processor(s) 804 and processor(s) 904) of the reader devices and/or other circuitry of the reader devices. Particularly, circuitry of the reader devices, including but not limited to processor and card reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for reader device registration, activation, and use, comprising:
   receiving, by a commerce platform over a communication network, a registration request for a reader device generated by a point of sale (POS) device to which the reader device is pairable with for performing transactions, wherein the registration request comprises at least identification data for the reader device;
   transmitting, by the commerce platform to the POS device, a registration code, wherein the transmitting causes the registration code to be displayed to a user associated with a merchant system seeking to register the reader device for use during merchant transactions;
   receiving, by the commerce platform from a merchant system, a message comprising merchant identification data and a second registration code purported to be the registration code transmitted to the POS device, the merchant identification data comprising at least a merchant identifier and a merchant location at which the reader device is located;
   in response to determining that the second registration code matches the registration code, the commerce platform,
      generating an encryption key associated with the reader device, wherein a corresponding encryption key is maintained at the commerce platform, and
      associating, by the commerce platform, the reader device with the merchant system in a device data store based on the identification data for the reader device; and
   transmitting, by the commerce platform, the encryption key to the merchant system, wherein the encryption key is provided by merchant system to the reader device via the POS device for use by the reader device when communicating transaction data to the commerce platform during merchant transactions.

2. The method of claim 1, further comprising:
   receiving, by the commerce platform, identification data for the reader device with a request to clear a transaction, wherein contents of the request are encrypted by the reader device;
   retrieving, by the commerce platform, the corresponding encryption key maintained at the commerce platform based on the identification data for the reader device;
   decrypting, by the commerce platform, the contents of the request using the retrieved corresponding encryption key;
   extracting, from a decrypted version of the contents of the request, at least one or more transaction parameters and payment information captured by the reader device from a payment card of a customer of the merchant;
   clearing, by the commerce platform, the transaction having the one or more transaction parameters with one or more authorization network systems using the payment information; and
   transmitting, by the commerce platform, a result of the clearing of the transaction to the reader device.

3. The method of claim 1, further comprising:
   generating a record in a device data tree associated with the merchant and the merchant location, wherein the device data tree is one of a plurality of device data trees maintained by the commerce platform, and wherein each of the device data trees is associated with a single location and a single merchant and contains one or more reader devices located at that single location.

4. The method of claim 1, wherein the receiving the registration request generated for the reader device further comprises:
   receiving configuration data indicative of one or more current configuration options to be deployed on the reader device;
   determining, based on the received configuration, that a configuration option is to be updated; and
   transmitting, by the commerce platform to the POS device, an update to the configuration option causing the POS device to transmit the configuration to the reader device to perform an update.

5. The method of claim 1, wherein the encryption key is a scoped encryption key associated with a set of permissible actions that the reader device can perform with the commerce platform during transaction including the transaction.

6. The method of claim 5, wherein the set of permissible actions associated with the scoped encryption key comprise a permission for the reader device to provide captured card data to the commerce platform in encrypted form using the scoped encryption key, and wherein a permission to transfer money to or from an authorization network server is not within the set of permissible actions associated with the scoped encryption key.

7. The method of claim 1, wherein the identification data for the reader device in the registration request comprises at least one of a globally unique device identifier, an internet protocol address of the device, and a device name.

8. The method of claim 1, wherein the reader device comprises one of a personal identification number (PIN) pad reader device or a mobile reader device, and wherein the reader device is configured to collect card data for a customer of the merchant during a transaction.

9. The method of claim 1, wherein the registration code comprises one of a phrase of two or more words, a text string, a numeric string, an alphanumeric string, or a visual code.

10. The method of claim 1, wherein the merchant system is to provide the encryption key to the reader device via POS device, and wherein the encryption keys is for use by the reader device to encrypt transaction data that is to be communicated to the commerce platform during the transaction, and wherein the merchant system is to provide a second, transaction encryption key to the reader device for use when the reader device communicates with the POS device during the transaction.

11. A non-transitory computer readable storage medium including instructions that, when executed by a processor, cause the processor to perform a method for reader device registration, activation, and use, the method comprising:
   receiving, by a commerce platform over a communication network, a registration request for a reader device generated by a point of sale (POS) device to which the reader device is pairable with for performing transactions, wherein the registration request comprises at least identification data for the reader device;
   transmitting, by the commerce platform to the POS device, a registration code, wherein the transmitting causes the registration code to be displayed to a user associated with a merchant system seeking to register the reader device for use during merchant transactions;
   receiving, by the commerce platform from a merchant system, a message comprising merchant identification data and a second registration code purported to be the registration code transmitted to the POS device, the merchant identification data comprising at least a merchant identifier and a merchant location at which the reader device is located;

in response to determining that the second registration code matches the registration code, the commerce platform, generating an encryption key associated with the reader device, wherein a corresponding encryption key is maintained at the commerce platform, and associating, by the commerce platform, the reader device with the merchant system in a device data store based on the identification data for the reader device; and transmitting, by the commerce platform, the encryption key to the merchant system, wherein the encryption key is provided by merchant system to the reader device via the POS device for use by the reader device when communicating transaction data to the commerce platform during merchant transactions.

12. The non-transitory computer readable storage medium of claim 11, further comprising:

receiving, by the commerce platform, identification data for the reader device with a request to clear a transaction, wherein contents of the request are encrypted by the reader device;

retrieving, by the commerce platform, the corresponding encryption key maintained at the commerce platform based on the identification data for the reader device;

decrypting, by the commerce platform, the contents of the request using the retrieved corresponding encryption key;

extracting, from a decrypted version of the contents of the request, at least one or more transaction parameters and payment information captured by the reader device from a payment card of a customer of the merchant;

clearing, by the commerce platform, the transaction having the one or more transaction parameters with one or more authorization network systems using the payment information; and transmitting, by the commerce platform, a result of the clearing of the transaction to the reader device.

13. The non-transitory computer readable storage medium of claim 12, further comprising:

generating a record in a device data tree associated with the merchant and the merchant location, wherein the device data tree is one of a plurality of device data trees maintained by the commerce platform, and wherein each of the device data trees is associated with a single location and a single merchant and contains one or more reader devices located at that single location.

14. The non-transitory computer readable storage medium of claim 11, wherein the receiving the registration request generated for the reader device further comprises:

receiving configuration data indicative of one or more current configuration options to be deployed on the reader device;

determining, based on the received configuration, that a configuration option is to be updated; and transmitting, by the commerce platform to the POS device, an update to the configuration option causing the POS device to transmit the configuration to the reader device to perform an update.

15. The non-transitory computer readable storage medium of claim 11, wherein the encryption key is a scoped encryption key associated with a set of permissible actions that the reader device can perform with the commerce platform during transaction including the transaction.

16. The non-transitory computer readable storage medium of claim 15, wherein the set of permissible actions associated with the scoped encryption key comprise a permission for the reader device to provide captured card data to the commerce platform in encrypted form using the scoped encryption key, and wherein a permission to transfer money to or from an authorization network server is not within the set of permissible actions associated with the scoped encryption key.

17. The non-transitory computer readable storage medium of claim 11, wherein the identification data for the reader device in the registration request comprises at least one of a globally unique device identifier, an internet protocol address of the device, and a device name.

18. The non-transitory computer readable storage medium of claim 11, wherein the reader device comprises one of a personal identification number (PIN) pad reader device or a mobile reader device, and wherein the reader device is configured to collect card data for a customer of the merchant during a transaction.

19. The non-transitory computer readable storage medium of claim 11, wherein the registration code comprises one of a phrase of two or more words, a text string, a numeric string, an alphanumeric string, or a visual code.

20. The non-transitory computer readable storage medium of claim 11, wherein the merchant system is to provide the encryption key to the reader device via the POS device, and wherein the encryption key is for use by the reader device to encrypt transaction data that is to be communicated to the commerce platform during the transaction, and wherein the merchant system is to provide a second, transaction encryption key to the reader device for use when the reader device communicates with the POS device during the transaction.

21. A system for reader device registration, activation, and use, comprising:

a memory; and a processor coupled with the memory, the processor configured to:

receive a registration request for a reader device generated by a point of sale (POS) device to which the reader device is pairable with for performing transactions, wherein the registration request comprises at least identification data for the reader device, transmit, to the POS device, a registration code, wherein the transmitting causes the registration code to be displayed to a user associated with a merchant system seeking to register the reader device for use during merchant transactions;

receive, from a merchant system, a message comprising merchant identification data and a second registration code purported to be the registration code transmitted to the POS device, the merchant identification data comprising at least a merchant identifier and a merchant location at which the reader device is located;

in response to determining that the second registration code matches the registration code, generate an encryption key associated with the reader device, wherein a corresponding encryption key is maintained at the commerce platform, and associate, by the commerce platform, the reader device with the merchant system in a device data store based on the identification data for the reader device, and transmit the encryption key to the merchant system, wherein the encryption key is provided by merchant system to the reader device via the POS device for use by the reader device when communicating transaction data to the commerce platform during merchant transactions.

22. The system of claim 21, wherein the processor is further configured to:
receive identification data for the reader device with a request to clear a transaction, wherein contents of the request are encrypted by the reader device;
retrieve, from the memory, the corresponding encryption key based on the identification data for the reader device;
decrypt the contents of the request using the retrieved corresponding encryption key;
extract, from a decrypted version of the contents of the request, at least one or more transaction parameters and payment information captured by the reader device from a payment card of a customer of the merchant;
clear the transaction having the one or more transaction parameters with one or more authorization network systems using the payment information; and
transmit a result of the clearing of the transaction to the reader device.

\* \* \* \* \*